US010900638B2

(12) United States Patent
Adamson

(10) Patent No.: US 10,900,638 B2
(45) Date of Patent: Jan. 26, 2021

(54) SHADE AND SHADOW MINIMIZING LUMINAIRE

(71) Applicant: AGrow-Ray Technologies, Inc., Boulder, CO (US)

(72) Inventor: Hugh Patrick Adamson, Boulder, CO (US)

(73) Assignee: AGROW-RAY TECHNOLOGIES, INC., Boulder, CO (US)

(*) Notice: Subject to any disclaimer, the term of this patent is extended or adjusted under 35 U.S.C. 154(b) by 0 days.

(21) Appl. No.: 16/385,150

(22) Filed: Apr. 16, 2019

(65) Prior Publication Data

US 2019/0323681 A1 Oct. 24, 2019

Related U.S. Application Data

(60) Provisional application No. 62/660,044, filed on Apr. 19, 2018, provisional application No. 62/700,702, filed on Jul. 19, 2018.

(51) Int. Cl.
| | |
|---|---|
| *A01G 7/04* | (2006.01) |
| *F21V 29/70* | (2015.01) |
| *F21V 7/09* | (2006.01) |
| *F21V 7/05* | (2006.01) |
| *A01G 9/24* | (2006.01) |

(52) U.S. Cl.
CPC .............. *F21V 7/09* (2013.01); *A01G 7/045* (2013.01); *F21V 7/05* (2013.01); *F21V 29/70* (2015.01); *A01G 9/243* (2013.01); *Y02A 40/25* (2018.01); *Y02P 60/12* (2015.11)

(58) Field of Classification Search
CPC ........ A01G 7/045; A01G 9/243; F21V 29/70; F21V 7/09; F21V 7/05
See application file for complete search history.

(56) References Cited

U.S. PATENT DOCUMENTS

| | | | |
|---|---|---|---|
| 1,021,766 A | 4/1912 | Ferguson | |
| 3,937,948 A | 2/1976 | Allison | |
| 4,128,307 A | 12/1978 | Badertscher et al. | |
| 4,329,021 A | 5/1982 | Bennett et al. | |

(Continued)

FOREIGN PATENT DOCUMENTS

| | | |
|---|---|---|
| GB | 1148677 | 4/1969 |
| WO | 2019/204224 | 10/2019 |
| WO | 2019/204255 | 10/2019 |

OTHER PUBLICATIONS

International Search Report and Written Opinion dated Jul. 10, 2019 in PCT/US2019/27529, 10 pages.

(Continued)

*Primary Examiner* — Arman B Fallahkhair

(57) ABSTRACT

A triangular extrusion is disclosed which reflects a significant portion of the light into the plant canopy. By the geometry of a triangular extrusion with reflective sides, only a small portion of the light is absorbed and most of the light is reflected into the canopy. An example shade and shadow minimizing extrusion luminaire for a plant canopy includes a reflector and a housing. The housing has two triangular shape ends The triangular shape is defined by angles selected to redirect light impinging on a face of the triangular shape ends of the housing, in both a downward and horizontal direction into the plant canopy without blocking or sacrificing the light.

16 Claims, 10 Drawing Sheets

(56) References Cited

U.S. PATENT DOCUMENTS

| | | | |
|---|---|---|---|
| 4,441,145 A | | 4/1984 | Antkowiak |
| 4,546,757 A | * | 10/1985 | Jakahi .................. F24S 50/80 |
| | | | 126/604 |
| 4,553,193 A | | 11/1985 | Evans |
| 4,883,340 A | * | 11/1989 | Dominguez ............ F21S 11/00 |
| | | | 359/593 |
| 5,095,414 A | | 3/1992 | Tinus |
| 5,130,925 A | | 7/1992 | Janes et al. |
| 5,174,793 A | | 12/1992 | Ikeda et al. |
| 5,721,471 A | | 2/1998 | Begemann et al. |
| 5,818,734 A | | 10/1998 | Albright |
| 5,851,309 A | * | 12/1998 | Kousa .................... F24S 50/00 |
| | | | 136/248 |
| 6,239,910 B1 | * | 5/2001 | Digert ...................... E06B 9/28 |
| | | | 160/104 |
| 6,341,041 B1 | | 1/2002 | Carlson |
| 7,168,839 B2 | | 1/2007 | Chinniah et al. |
| 7,231,128 B2 | | 6/2007 | Muhs et al. |
| 7,301,174 B1 | | 11/2007 | Popovich |
| 7,566,137 B2 | | 7/2009 | Veskovic |
| 7,654,702 B1 | | 2/2010 | Ding et al. |
| 7,675,251 B2 | | 3/2010 | Gordin et al. |
| 7,967,469 B2 | | 6/2011 | Fang et al. |
| 8,028,691 B2 | * | 10/2011 | Maxson .................. E06B 7/082 |
| | | | 126/702 |
| 8,029,159 B2 | * | 10/2011 | Chen ...................... F21V 29/70 |
| | | | 362/249.1 |
| 8,098,024 B1 | | 1/2012 | Gordin |
| 8,525,439 B1 | | 9/2013 | Gordin |
| 8,575,861 B1 | | 11/2013 | Gordin et al. |
| 8,714,774 B2 | | 5/2014 | Dubuc |
| 8,743,462 B2 | | 6/2014 | Freier et al. |
| 8,824,051 B2 | * | 9/2014 | Thuot ..................... E06B 7/082 |
| | | | 359/596 |
| 8,939,607 B2 | | 1/2015 | Casper et al. |
| 9,025,249 B2 | | 5/2015 | Maxey |
| 9,066,401 B1 | | 6/2015 | Gordin et al. |
| 9,437,786 B2 | | 9/2016 | Mastin et al. |
| 9,532,411 B2 | | 12/2016 | Conrad et al. |
| 9,541,261 B2 | * | 1/2017 | Klase ..................... F21V 14/02 |
| 9,618,178 B1 | | 4/2017 | Chappell |
| 9,750,105 B2 | | 8/2017 | Rantala |
| 9,964,269 B2 | * | 5/2018 | Upward ................. G02B 17/006 |
| 10,028,350 B2 | | 7/2018 | Adams et al. |
| 10,119,661 B2 | | 11/2018 | May |
| 10,149,439 B2 | | 12/2018 | Hanson et al. |
| 2003/0127998 A1 | | 7/2003 | Notarianni et al. |
| 2005/0276053 A1 | | 12/2005 | Nortrup et al. |
| 2009/0173375 A1 | * | 7/2009 | Frazier .................... F24S 20/63 |
| | | | 136/246 |
| 2009/0277496 A1 | * | 11/2009 | Khazeni ............... H01L 31/0543 |
| | | | 136/246 |
| 2009/0288340 A1 | | 11/2009 | Hess |
| 2010/0110673 A1 | | 5/2010 | Bergman et al. |
| 2010/0301768 A1 | | 12/2010 | Chemel et al. |
| 2010/0309662 A1 | | 12/2010 | Zheng |
| 2011/0183368 A1 | * | 7/2011 | Chapman ............... A01G 7/045 |
| | | | 435/29 |
| 2012/0140468 A1 | * | 6/2012 | Chang ...................... F21S 2/00 |
| | | | 362/235 |
| 2012/0320570 A1 | | 12/2012 | Casper et al. |
| 2013/0063930 A1 | * | 3/2013 | Dubuc ................... A01G 7/045 |
| | | | 362/145 |
| 2013/0083554 A1 | | 4/2013 | Jaster |
| 2013/0114253 A1 | | 5/2013 | Segawa et al. |
| 2013/0139437 A1 | | 6/2013 | Maxik et al. |
| 2013/0283683 A1 | | 10/2013 | Ringbom et al. |
| 2014/0085731 A1 | | 3/2014 | Farris et al. |
| 2015/0305108 A1 | | 10/2015 | Probasco |
| 2015/0351325 A1 | | 12/2015 | Shelor et al. |
| 2016/0069543 A1 | | 3/2016 | Cronk et al. |
| 2016/0235014 A1 | | 8/2016 | Donham et al. |
| 2016/0278304 A1 | | 9/2016 | Elsegood |
| 2016/0338169 A1 | | 11/2016 | Rantala |
| 2017/0020084 A1 | | 1/2017 | Alfier et al. |
| 2017/0238477 A1 | | 8/2017 | Lloyd |
| 2017/0248289 A1 | | 8/2017 | Vasylyev |
| 2017/0339846 A1 | | 11/2017 | Lawrence et al. |
| 2018/0020522 A1 | | 1/2018 | Rogers, III |
| 2018/0054978 A1 | | 3/2018 | Dubuc et al. |
| 2018/0116025 A1 | | 4/2018 | Adams et al. |
| 2018/0116127 A1 | | 5/2018 | Krijn et al. |
| 2018/0213735 A1 | | 8/2018 | Vail et al. |
| 2018/0220592 A1 | | 8/2018 | Gilley et al. |
| 2018/0242429 A1 | | 8/2018 | Ashdown et al. |
| 2018/0317398 A1 | | 11/2018 | Wells |
| 2019/0320590 A1 | | 10/2019 | Adamson et al. |

OTHER PUBLICATIONS

International Search Report and Written Opinion dated Jul. 2, 2019 in PCT/US2019/027601, 10 pages.

Co-owned U.S. Appl. No. 16/384,573, filed Apr. 15, 2019.

* cited by examiner

SHADE AND SHADOW MINIMIZING LUMINAIRE

CROSS REFERENCE TO RELATED APPLICATIONS

This application claims the priority benefit of U.S. Provisional Patent Application No. 62/660,044 filed Apr. 19, 2018 for "Shade And Shadow Minimizing Extrusion Luminaire" (Attorney Docket No. 9880-003-PRV), and U.S. Provisional Patent Application No. 62/700,702 filed Jul. 19, 2018 for "Optimal Luminaire Extrusion For A Greenhouse Supplemental Lighting System" (Attorney Docket No. 9880-007-PRV), each hereby incorporated by reference in its entirety as though fully set forth herein.

BACKGROUND

Luminaries are used to supply or add supplemental lighting in many different settings. They may be a single fixture or have multiple sections. Aluminum extrusions are often used for their low cost and heat-dissipating abilities (heat sinks).

When used for supplemental lighting, the extrusion's geometric shape can compromise their overall effectiveness. For example, when used as a supplemental source of light in a greenhouse, the shadow created by the luminaries requires the overall power of the luminaries to be increased to compensate for the light lost due to shading, thus increasing electricity costs to the grower and reducing the overall benefits.

DETAILED DESCRIPTION

Figure 1:
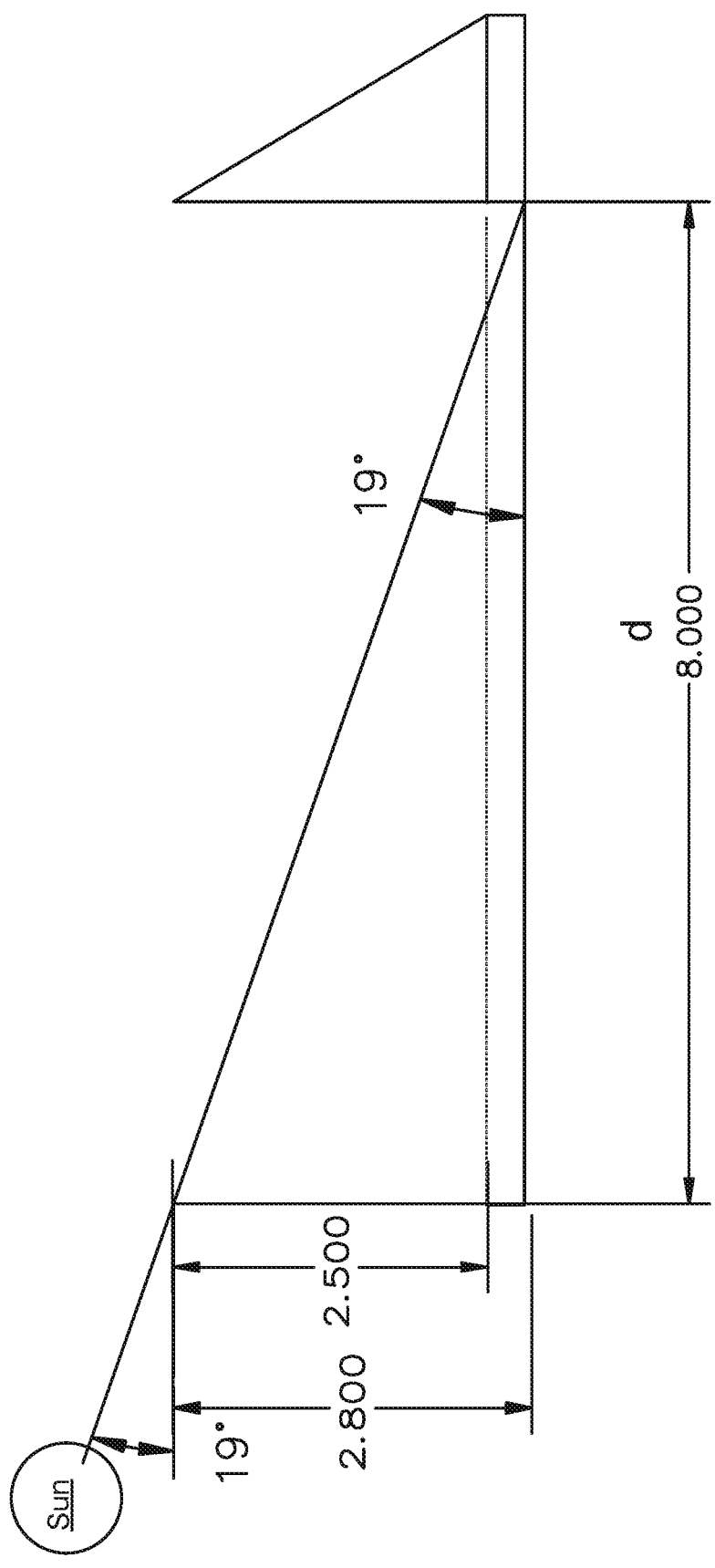
FIG. 1 illustrates design of an example extrusion according to Case 1 with the angle of the sun never exceeding 90 degrees.

Horticultural supplemental lighting is used worldwide to augment natural light for plant canopies. In a typical greenhouse, there may be thousands of extrusions mounted into multi-extrusion fixtures. Each extrusion has three functions, (a) to house the light sources, (b) to offload the waste heat, and (c) to cast as small a shadow as possible on the grow area.

Any object in between a light source (such as the sun, or an artificial light source) and the plant canopy will cast a shadow. This object can be the artificial light source itself. The physics of light dictate that any light impinging on a surface must be reflected, transmitted or absorbed.

The shadowing caused by the Luminaire shape can be considerable. A common luminaire used in agriculture can obscure as much as 28.7% of the incident light falling onto the plant canopy. Supplying additional power to the luminaries to compensate for the light lost is counter-productive to the overall benefits desired by the user.

The general solution to this issue is to reduce the overall width of the luminaries extrusions but the general shape of a heat sink extrusion limits these efforts. Their typical shape is a box with multiple vertical fins. Reduction of the extrusion heat sinks from a width of 2.5 inches to a width of 1.5 inches is useful but, in a typical length 44-inch long luminaire, the shadow is 110 square inches for the 2.5-inch width versus 66 square inches for the 1.5-inch width.

To illustrate a common situation, six extrusion luminaries may be provided to add supplemental lighting in a greenhouse canopy of 16 square feet or 2304 square inches. For a luminaire with six extrusions of 2.5-inch width, the shadow created by the extrusions is about 28.7% of the incident light, whereas the six 1.5-inch extrusions is still about 17.2%. To compensate for the shadow area, the electrical power to the luminaries has to be increased by that percentage to provide more light. This is not desirable due to the cost of the added electricity and potential reduced lifetime of the luminaire.

Extrusions for supplemental lighting are also designed to offload waste heat. That is, the extrusions are designed to be pseudo-blackbodies. For example, extrusions may have fins to create a large surface area and are generally black in color. The black fins maximize the ability of the extrusions to offload the waste heat from the light sources (e.g., LEDs) within the extrusions. But the shape and color of the extrusions also absorb almost all of the light that impinges on the extrusions, which increases their temperature.

A single and a multi-extrusion luminaire are disclosed. In an example, the luminaire has a triangular shape with the angles configured to redirect the light both downward and horizontally into the canopy without blocking or sacrificing significant light. By changing the shape of the luminaire extrusion to a triangular shape, the effective shadow can be radically reduced by 50% to 90% (e.g., depending on the number of reflectors (luminaries), and the distance from one to the next).

The reflector of the luminaire disclosed herein may be implemented in any situation where incident light is being supplemented by additional light and the shadowing of the incident light is objectionable. In an example, the reflector is oriented where the incident light crosses over the reflector at a zero-degree angle. In a typical greenhouse, this is an East-West orientation.

The multi-extrusion luminaire disclosed herein makes supplemental (artificial) lighting in a greenhouse more practical. It reduces shadows by a large factor, >90% or >50% (e.g., depending upon the light transit over the reflector, the number of reflectors (luminaries), and the distance from one to the next). It may help to reduce electrical power for supplemental lights by virtually eliminating the need for more light to offset shadows from the luminaries.

The design of the luminaire disclosed herein may also help reduce heat absorption by the luminaire, thus decreasing the heat in the luminaire and increasing the lifetime of the luminaire.

Before continuing, it is noted that as used herein, the terms "includes" and "including" mean, but is not limited to, "includes" or "including" and "includes at least" or "including at least." The term "based on" means "based on" and "based at least in part on." Although specific measurements and computations are provided herein by way of illustration, these are for example only and the invention is not limited in this regard.

In a large greenhouse where there may be several thousand light fixtures each requiring 600 watts of supplemental light, the overall efficiency gain and cost reductions by using the triangular extrusions are significant. By way of illustration, if there are 1000 fixtures each requiring 600 watts of light at 100% efficiency, the overall electric power required is 600,000 watts. With a shadow caused loss of 25%, the required power is 600,000 multiplied by 1.25 or 750,000 watts. But if the shadow caused loss is only 10%, the required electrical power is only 600,000 multiplied by 1.1 or 660,000 watts. This is a reduction of 90,000 watts of electrical power due to the use of the triangular extrusions disclosed herein, and results in significant operational savings and minimizes environmental impact to the greenhouse operator.

The complete derivations described herein may be implemented to design any of a wide variety of new luminaire configurations. However, it is noted that the derivations may be modified based on various design considerations (e.g., mathematical substitutions/alternatives, etc.). Likewise, the configuration of the luminaire(s) may be modified based on various design considerations (e.g., size, output, materials, end-use, etc.). Such modifications to the derivations and the configuration of the luminaire(s) are well within the ability of those having ordinary skill in the art after becoming familiar with the teachings herein.

In a first example, the extrusions disclosed herein can be oriented as the sunlight is impinging on the triangle face. This example is referred to herein as Case 1. In a second example, the extrusions disclosed herein can be oriented as the sunlight is impinging on the long side of the extrusion. This example is referred to herein as Case 2.

FIG. 1 illustrates design of an example extrusion according to Case 1 with the angle of the sun never exceeding 90 degrees. During the time of the year when no supplemental lighting is required, the shadows of the extrusions reduce the overall light reaching the canopy. If the light loss is 25% due to shadows, the system is only 75% efficient. A second situation is when the supplemental lighting is needed; a 25% shadow loss requires at least an additional 25% more supplemental electrical energy to compensate for that loss.

Each triangular extrusion is positioned with the Apex at the top. The sides of the extrusion are angled, and the sun reflects off the sides downward into the plant canopy. As the sun never exceeds 90° elevation in this example, the two triangular sides may have different reflection angles.

An example system or "lighting fixture" may have at least three triangular extrusions. But the angles can be illustrated with two extrusions. The three reflected angles are 1) Entrance Angle1 is a function of the height of the extrusion and the distance between the extrusions. This represents the lowest sun elevation angle where all the sunlight passes between the extrusions into the canopy below. The practical considerations for the supplemental lights Field of View generally dictates the center to center distance between the extrusions. As such, the desired Entrance Angle equation is given by the following equation:

$$\text{EntranceAngle1(degrees)} = (H/d)*57.265 \qquad \text{EQN (1)}$$

The solution for the total height (H) is as follows. For d (right angle extrusion), the center to center distance between extrusions is 8 inches. For d (not right angle), the center to closest base distance for entrance angle1 is 19.3°.

This solution is for a right angle extrusion and is given by the following equation:

$$H := 4 \text{ guess} \qquad \text{EQN (2)}$$

requirements $d := 8$  $Entranceangle1 := 19.3$ given $$\left(\operatorname{atan}\left(\frac{H}{d}\right) \cdot 0.0174^{-1}\right) - Entranceangle1 = 0 \text{ degrees}$$

$$H := \text{find}(H)$$

$$H = 2.792$$

The solution is illustrated in FIG. 1, wherein the Entrance Angle is 19.3 degrees.

Figure 2:
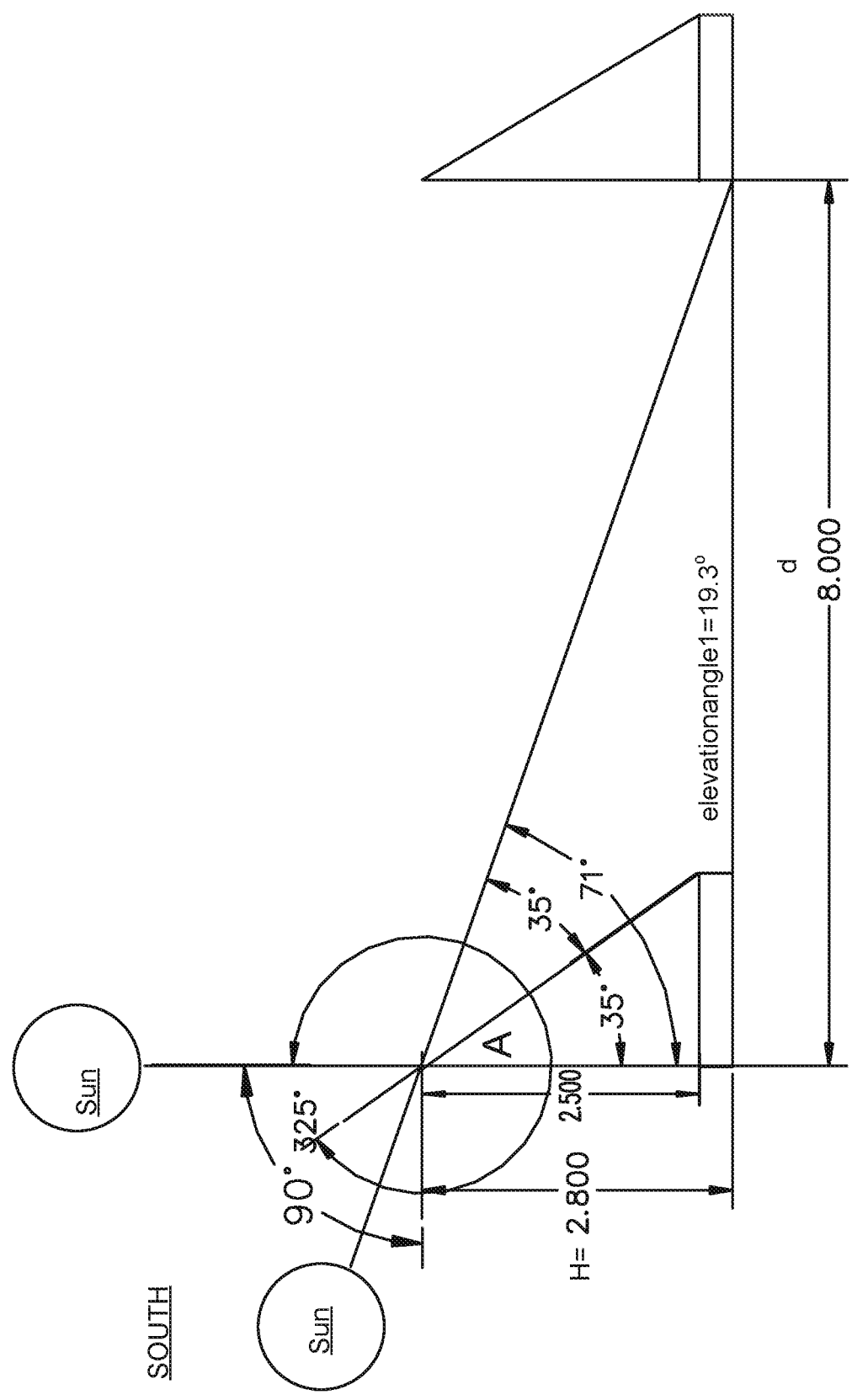
FIG. 2 illustrates design of an example extrusion according to Case 1 with the angle of the sun at 90 degrees.

FIG. 2 illustrates design of an example extrusion according to Case 1 with the angle of the sun at 90 degrees. When the sun is less than 90 degrees, the light is reflected lower into the plant canopy. This angle is a function of the height of the extrusion and the vertex angle of the extrusion. The maximum reflected angle for this case is the complement of the Entrance Angle.

The equation for the vertex angle A shown in FIG. 2 is given by the following equations:

$$\text{maximum reflected angle } M \text{ (for 90° entrance angle)} = 70.6° \qquad \text{EQN (3)}$$

$$\text{vertex angle } A \text{ (for 90° maximum reflected angle)} = M/2 = 35.3° \qquad \text{EQN (4)}$$

It is noted that this defines the width of the base of the extrusion for a sun elevation angle of 90°.

Figure 3:
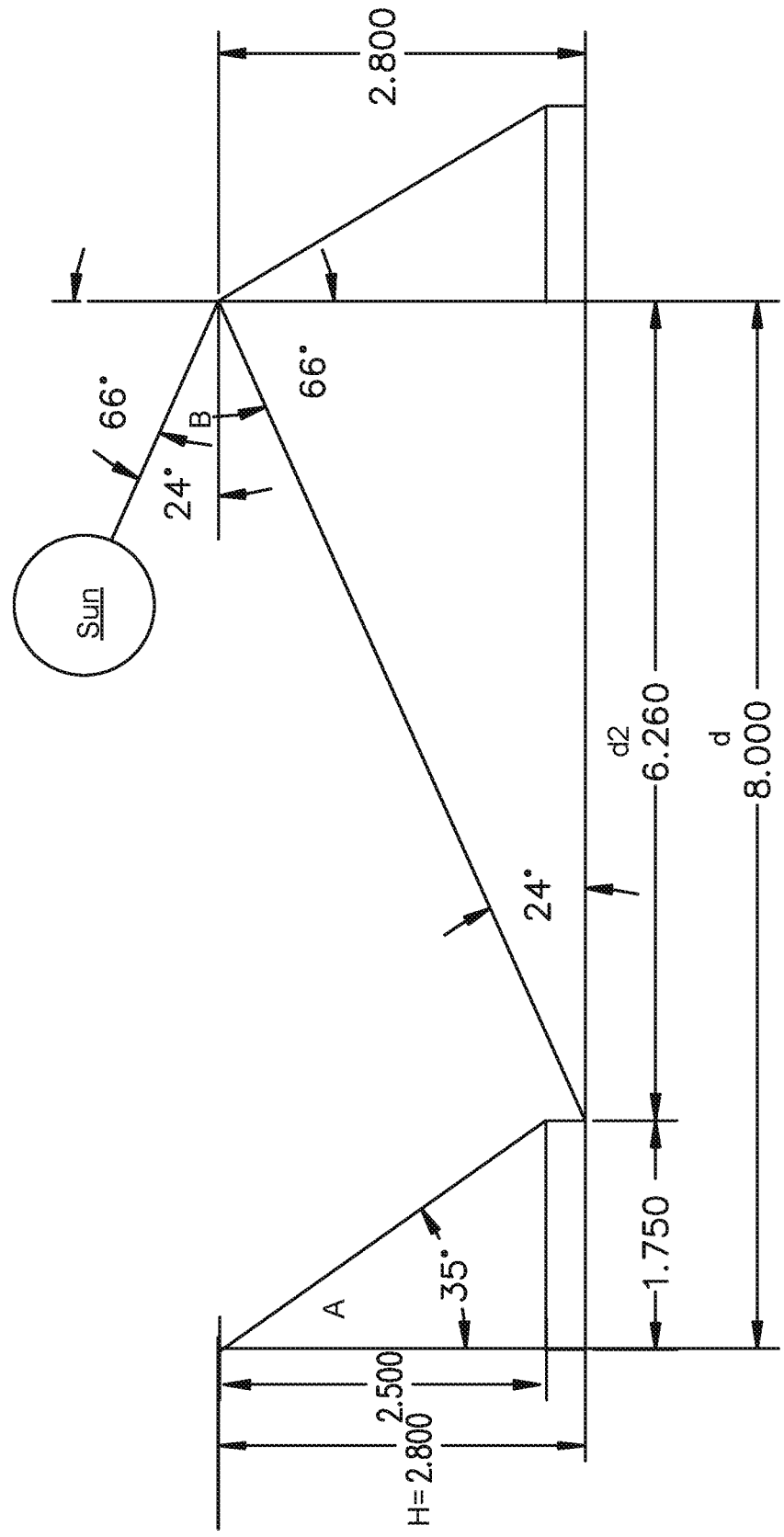
FIG. 3 shows the ElevationAngle2 (angle B) for the side facing the sun is 24.1 degrees.

In FIG. 3, the ElevationAngle2 (angle B) for the side facing the sun is 24.1 degrees. This angle is a function of the total height (H) of the extrusion and the vertex angle (A) and the base width created by (H) and (A). It is the minimum sun elevation angle that reflects all the sunlight on the sunlit face into the canopy below.

The equation for the Elevationangle2 for a right angle extrusion is given by the following equations:

$$\text{For the right angle triangular extrusion the tilt angle} = 0 \qquad \text{EQN (5)}$$

$$\text{Elevationangle2 (degrees)} = (90 \text{ sun elevation angle}) + 2 \times \text{tilt angle} \qquad \text{EQN (6)}$$

The solution is given by the following equation:

$$basewidth := 1.75 \quad d = 8 \qquad \text{EQN (7)}$$

$$d2 := d - basewidth$$

$$H := 2.8$$

$$B := \operatorname{atan}\left(\frac{H}{d2}\right) \cdot 57.265 = 24.119$$

Figure 4:
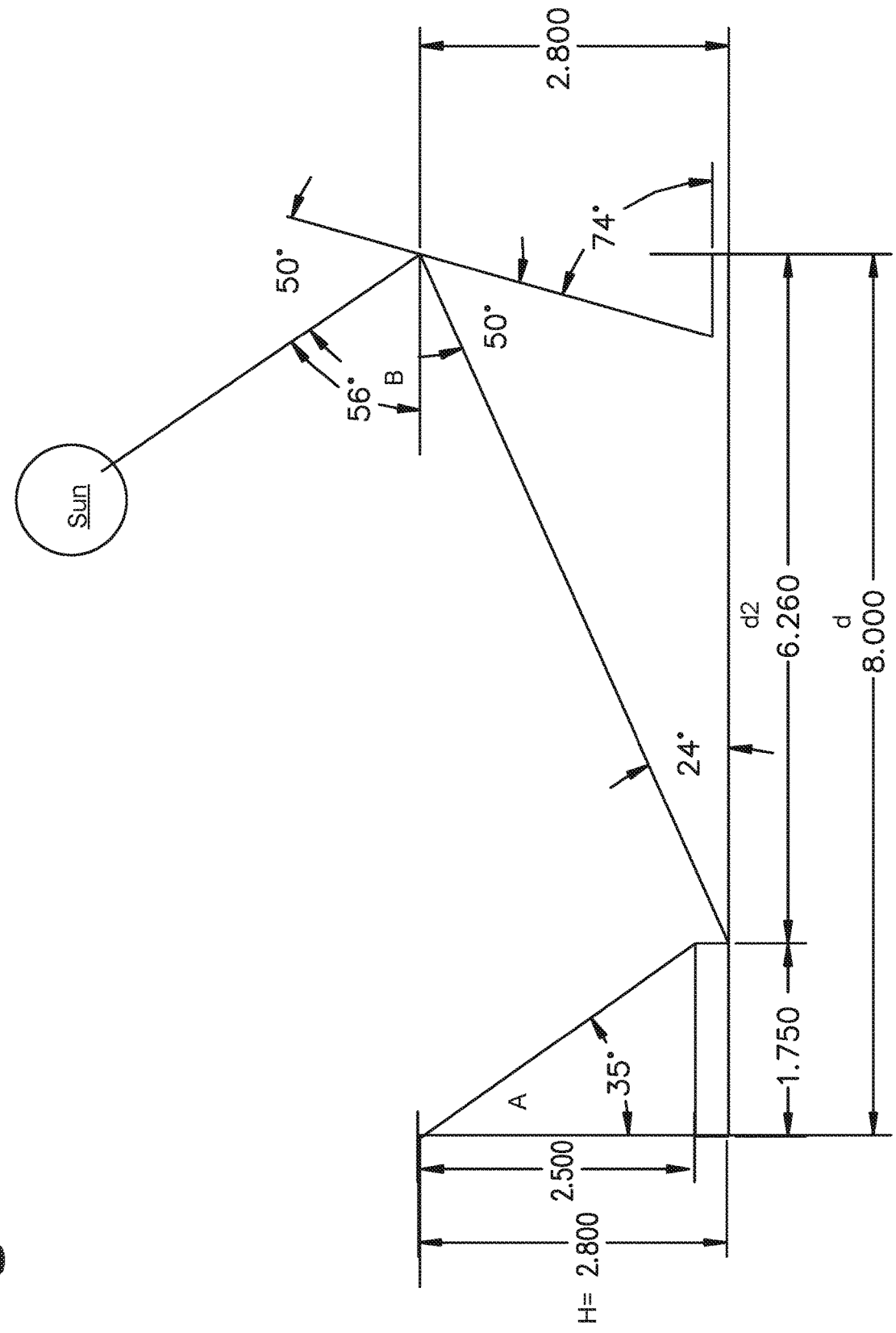
FIG. 4 shows the ElevationAngle2 (angle B) for the side facing the sun is 55.7 degrees when the front surface angle is 74.2 degrees.

In FIG. 4, the ElevationAngle2 (angle B) for the side facing the sun is 55.7 degrees when the front surface angle is 74.2 degrees. This is referred to as a tilted extrusion. If the sunlit face of the extrusion is not a right angle (e.g., the lower angle is 74.2° instead of 90°), then Elevationangle2 increases the tilt angle.

For example, if the sunlit surface is 74.2°, the Elevationangle2 is 24.1°+31.6°. This is twice the difference between 90° and 74.2°. The change from a 90° face to 74.2°, also changes the Elevationangle2 to 55.7° for this example, as seen in FIG. 4. In this example, the tilt angle=90-74.2 or 15.8°. This underscores the fact that for Case 1, a right angle extrusion is the best choice.

Figure 5:
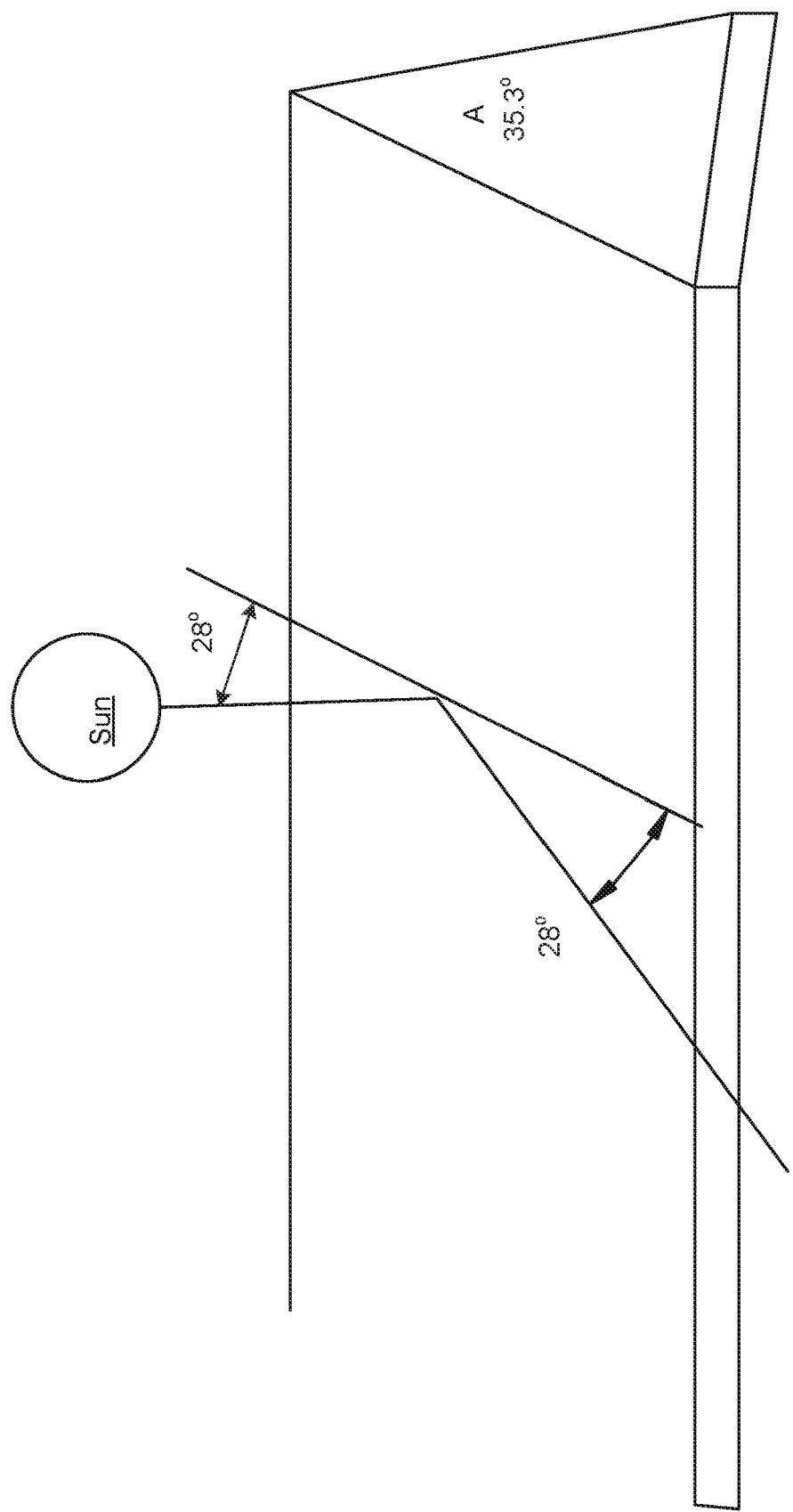
FIG. 5 illustrates design of an example extrusion according to Case 2, where the length of the extrusion is 44 inches.

FIG. 5 is a design of an example extrusion according to Case 2. In this example, the length of the extrusion is 44 inches. The sunlight is directed down along the length of the extrusion, and the reflected ray is a function of the Azimuth angle and the vertex angle (A).

Figure 6:
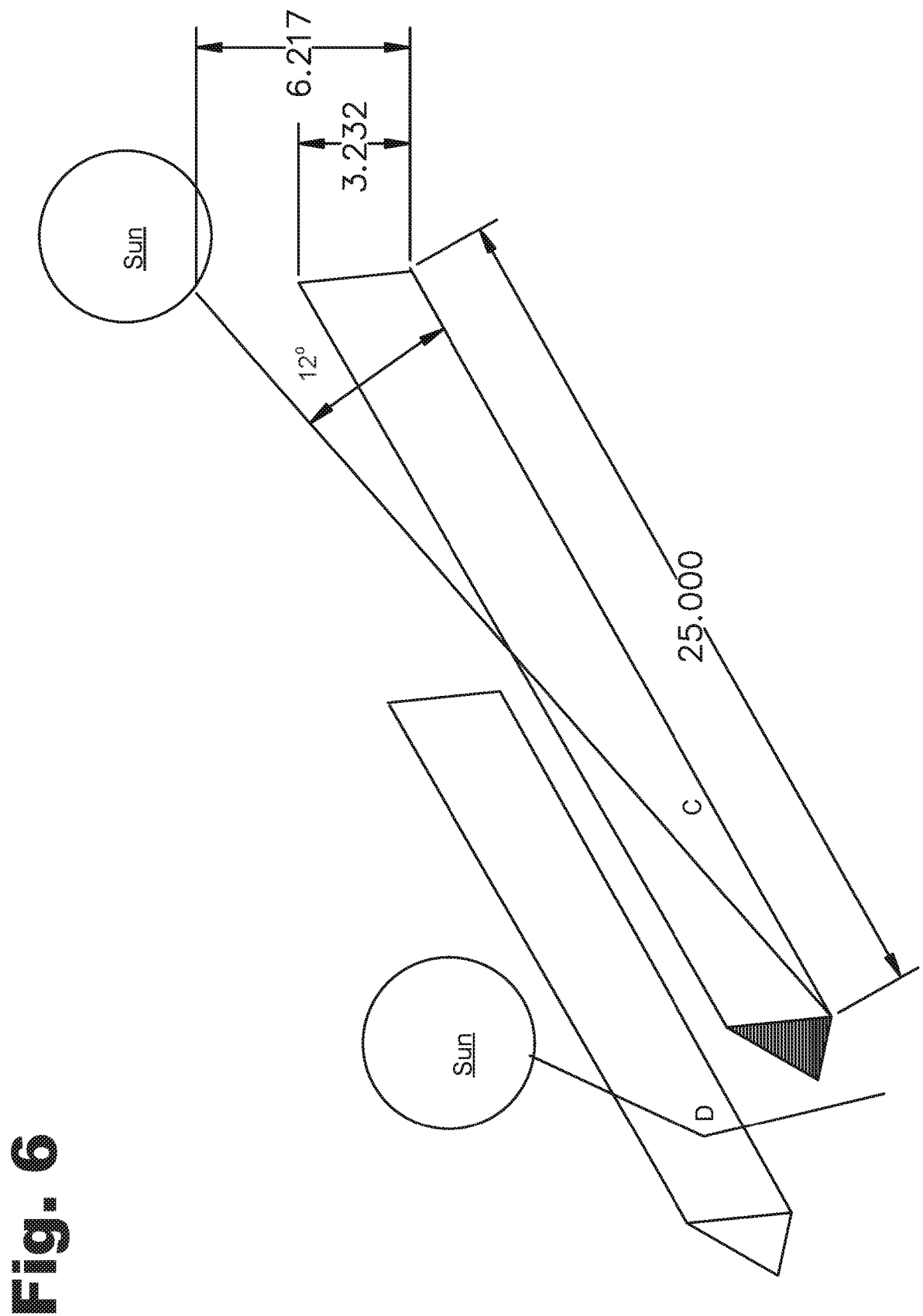
FIG. 6 illustrates the entrance angle C for an extrusion length of 25 inches, and an end cap height of 6.217 inches.

FIG. 6 illustrates the entrance angle C for an extrusion length of 25 inches, and an end cap height of 6.217 inches. The extrusion length in the example from FIG. 5 is 46 inches in length. Therefore, angle C is less than about 7 degrees. FIG. 6 also illustrates the reflection angle D for the sun over the extrusion. The reflected ray from D goes under the adjacent extrusion.

Each triangular extrusion is positioned with the Apex at the highest vertical level. The sides of the extrusion are angled and the sun reflects off the sides downward into the plant canopy. As the sun never exceeds 90°, the two triangular sides may have different reflection angles depending upon the azimuth angle of the sun. FIG. 6 shows the two reflection angles that occur for any Case 2 multi-extrusion configuration. The angles are illustrated in FIG. 6 with two extrusions. But an example fixture includes at least three triangular extrusions.

The design for a triangular extrusion includes: 1) determine the waste heat that needs to be released into the air (watts); and 2) determine the required spacing (d) of the extrusions. The spacing (d) is typically an input value.

For example, in a six extrusion fixture with a width of 44 inches, the six extrusions may be about 8 inches apart. This distance (8 inches) is the center to center distance (d) for a right angle extrusion. In this example, d2 is the distance for a tilted extrusion. In the above examples, the center to center distance is 8 inches for a right angle extrusion and (d2) is 6.26 inches for the tilted extrusion.

Next, the required entrance angle is input. The entrance angle determines the total height of the extrusion. In the above examples, for the right angle extrusion, the required entrance angle is 19.3°. The entrance angle determines the total height (H). In this example, H is 2.8 inches. It is noted that the height (H) can be used to calculate the entrance angle.

Next, the required vertex angle is found for the backside maximum reflected angle. In the above examples, the maximum vertex angle (A) is (about 90° minus the maximum reflected angle) divided by 2, which is 35.3°. This angle reflects a 90° sun elevation angle completely into the plant canopy.

Using the total height (H), the inner distance (d2) and vertex angle (A) of the extrusion can be used to calculate the maximum front side reflected angle (Elevationangle2). In the above examples, the vertical angle for the sunlit surface is 90° and 74.2°. The equation is given by the following:

$$\text{Elevationangle2} = (90 - \text{elevation angle}) + (2 \times \text{tilt angle}) \quad \text{EQN (8)}$$

After all the dimensions are determined, check that the total surface area is adequate to release the waste heat. The ratio of surface area to waste heat (watts) is in the range of about 6 to 10, e.g., depending on the air flow across the extrusion.

At sunrise in the Northern Hemisphere, the sun begins simultaneous rotation from East to South and also increases its elevation angle from 0° to the maximum elevation angle (which is dependent on the latitude). For example, in Boulder Colo. in March, the maximum elevation angle is about 47°. But in the summer, the maximum elevation angle will approach about 75°.

As Case 2 has the lowest entrance angle, the preferred orientation of a fixture with the right angle triangular extrusions is to orient the fixture so that the triangular face is oriented South (e.g., as in Case 1). The reason for this is as the sun begins its rotation, the sunlight passes over the long side of the extrusion, which has the lowest entrance angle, and as the azimuth rotation continues from East to South with the elevation angle increasing, the sunlight is continually directed downward into the plant canopy. The other orientation (e.g., the triangular face oriented East) is desirable for an isosceles triangle extrusion due to the high entrance angle. Of course, design considerations such as customer requirements and/or higher latitude locations may also dictate an alternative orientation.

Examples

The following examples are provided merely to illustrate an example design according to the teachings herein, and are not intended to be limiting. These examples were generated using MATHCAD™.

Figure 7:
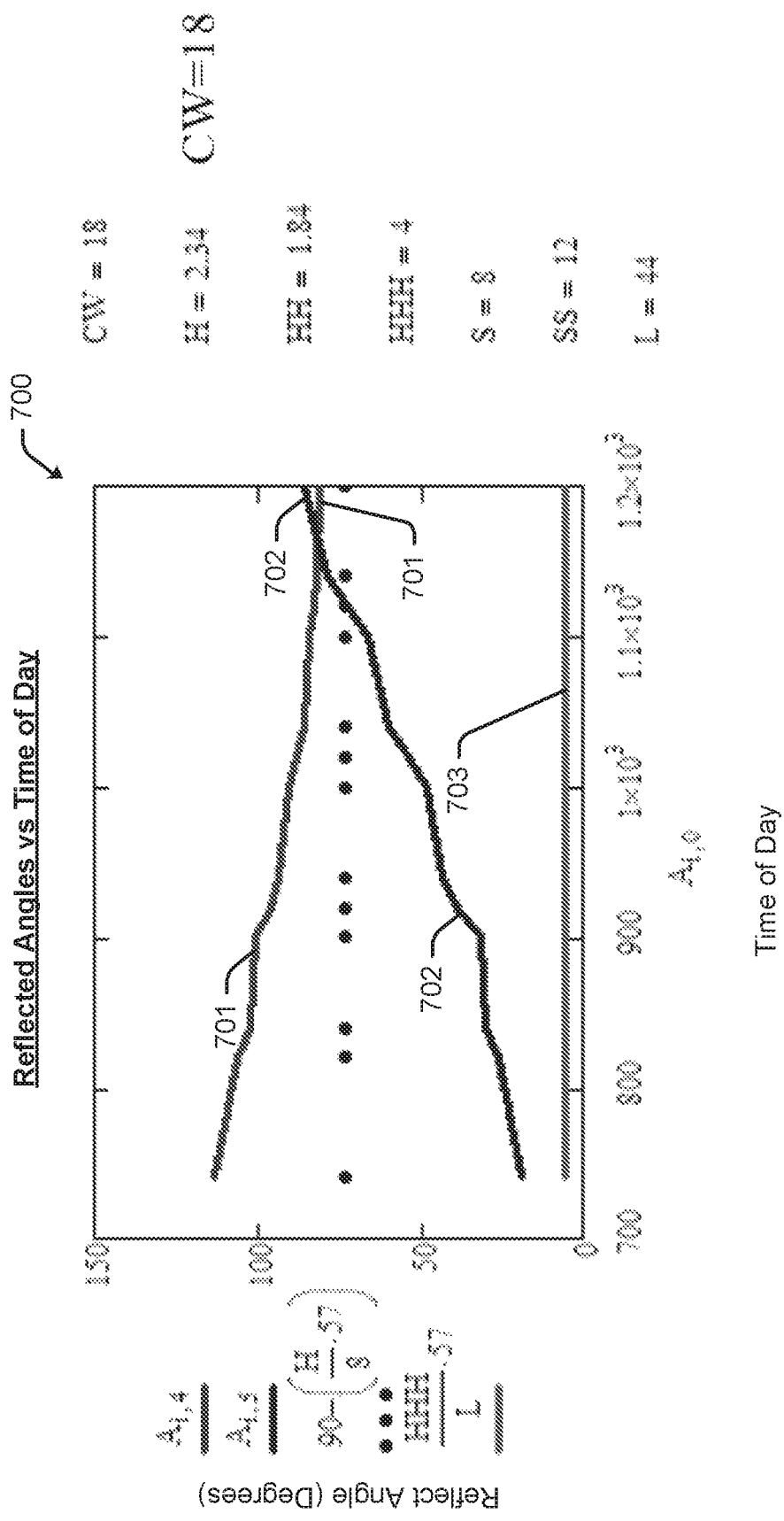
FIG. 7 is a plot for an isosceles triangular extrusion with 69.9° sides.

Using the actual sun elevation and azimuth data for Boulder, Colo., on Mar. 7, 2019, the raw data was input to a MATHCAD™ worksheet, and the calculations for an isosceles triangular extrusion with 69.9° sides are presented in the plot 700 shown in FIG. 7. The plot line 701 is the reflected angle due to the sun elevation angle, which must be lower than about 73.755 degrees to be reflected into the canopy (illustrated by the dots in plot 700). The plot line 702 shows the azimuth angle as the sun rotates from East to South (about 20 to 90 degrees). The plot line 703 is the entrance angle for Case 2.

Figure 8:
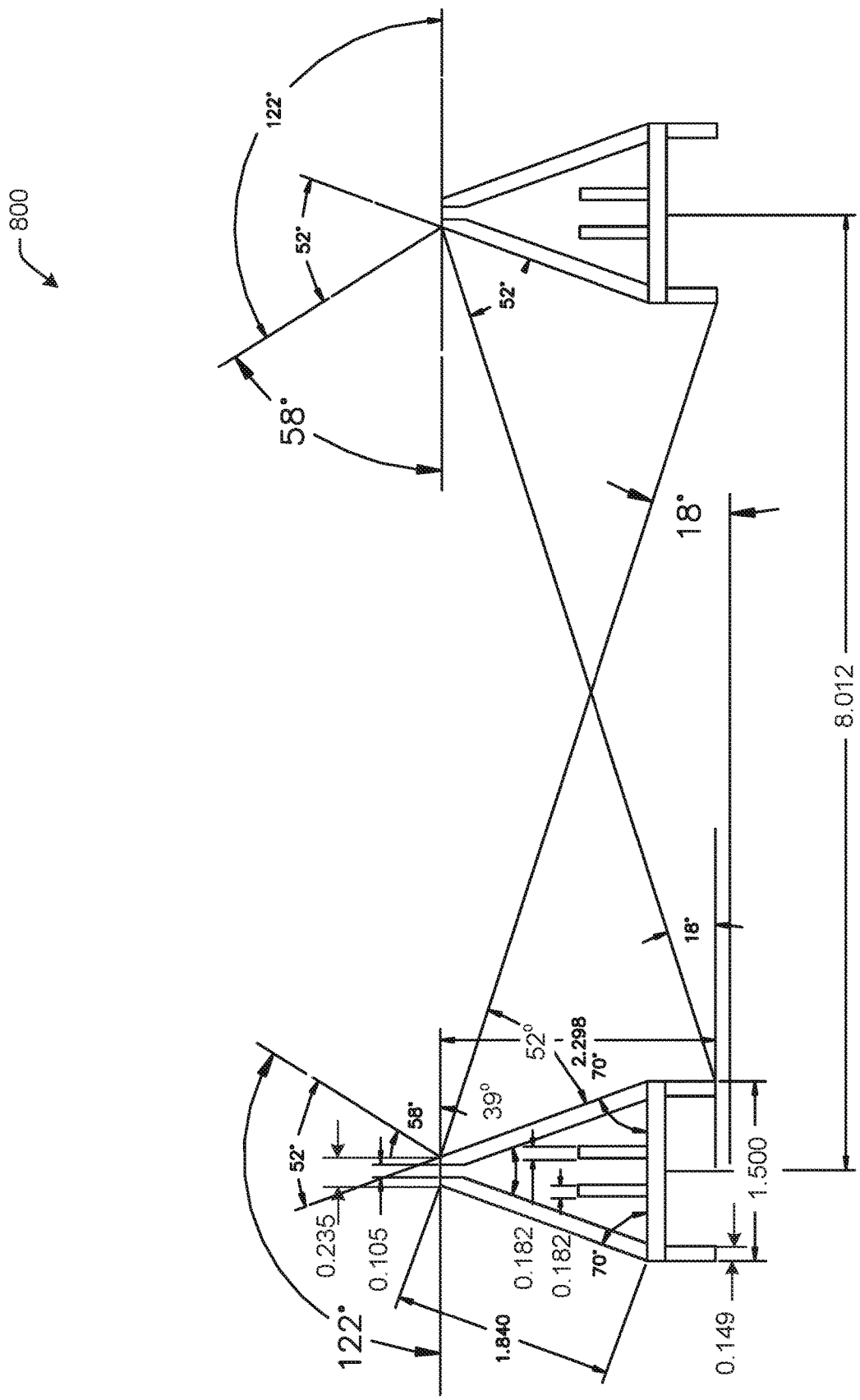
FIG. 8 illustrates an example configuration of an extrusion based on the example data shown in FIG. 7.

FIG. 8 illustrates an example configuration 800 of a system of extrusions based on this data. Measurements are shown for purposes of illustration and are not intended to be limiting. Measurements for the extrusions are substantially the same in this example. In this example, the extrusion height is about 2.28, and the entrance angle is about 17.5 degrees. The backside reflects all light less than about 121.9 degrees. The frontside minimum elevation is about 57.9 degrees.

On Mar. 7, 2019, for the sunlight to be reflected into the canopy according to Case 1, the sun elevation angle needs to be 57.7°. But the sun angle for this day is only 47°. Accordingly, the extrusion should be oriented so that the triangular face is pointing East/West (Case 2). The sunlight will be reflected down into the canopy along the long side of the extrusion approximately when the Azimuth is >45°. During the main part of the day almost all the sunlight will be reflected into the canopy.

Figure 9:
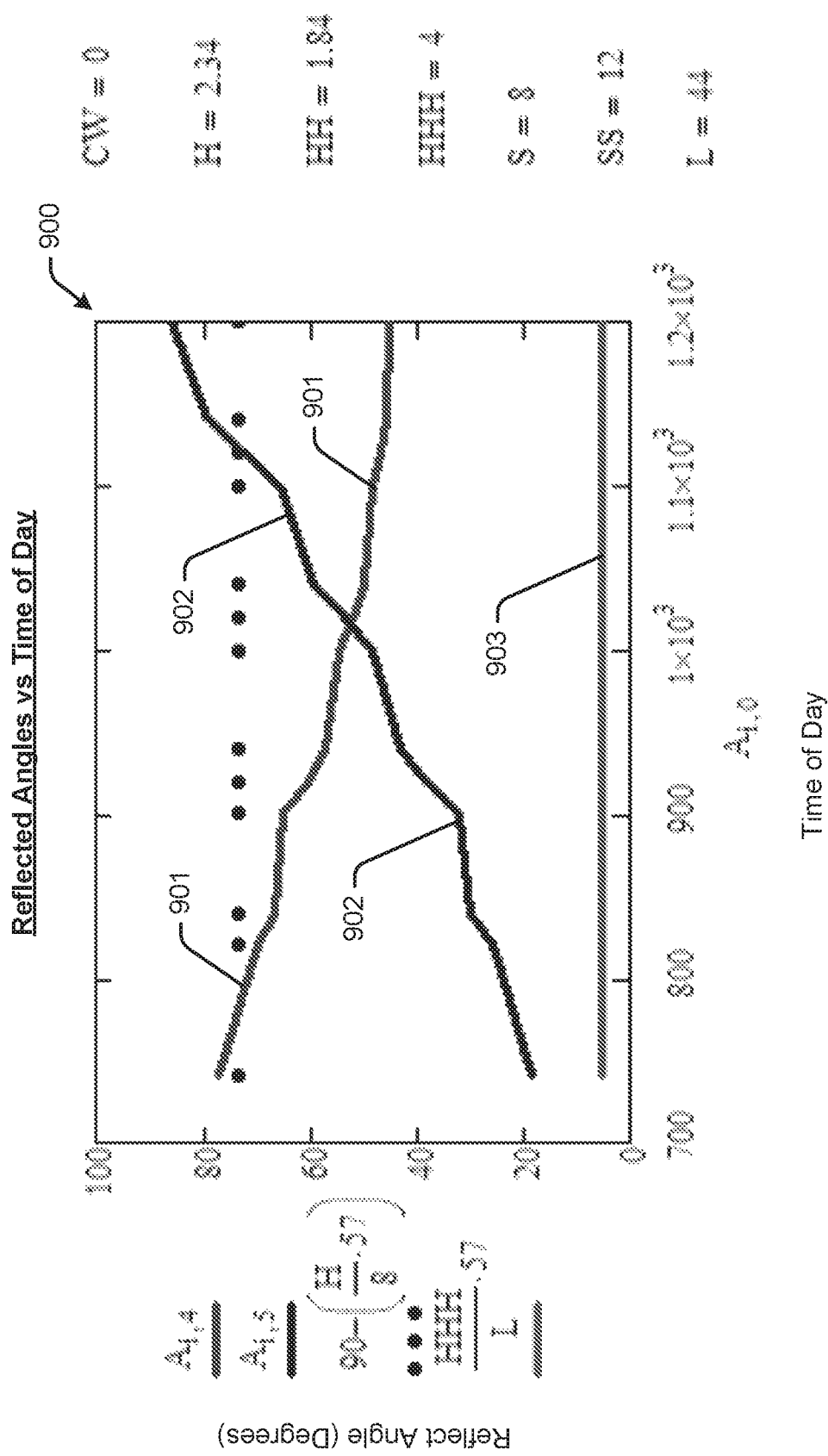
FIG. 9 is a plot illustrating changing the extrusion of the example in FIGS. 7 and 8, to a right angle extrusion (also Case 1).

FIG. 9 is a plot 900 illustrating changing the extrusion to a right angle extrusion (also Case 1). The extrusion is rotated about 90 degrees. The entrance angle is about 17.5 degrees. The backside reflects everything less than about 82.1 degrees. The frontside minimum elevation is about 19.8 degrees.

The change is rotating the triangular face to 90° from 69.9°. The height increases to 2.34 versus 2.28 inches, as shown by the plot 900. In FIG. 9, plot line 901 is the reflected angle due to the sun elevation, which must be lower than about 73.328 degrees to be reflected into the canopy (represented by the dots in plot 900). Plot line 902 is the azimuth angle as the sun rotates from east to south (about 20 to 90 degrees). Plot line 903 shows the entrance angle for Case 2. Now the sunlight is reflected into the canopy by 8 AM, making a big difference.

Figure 10:
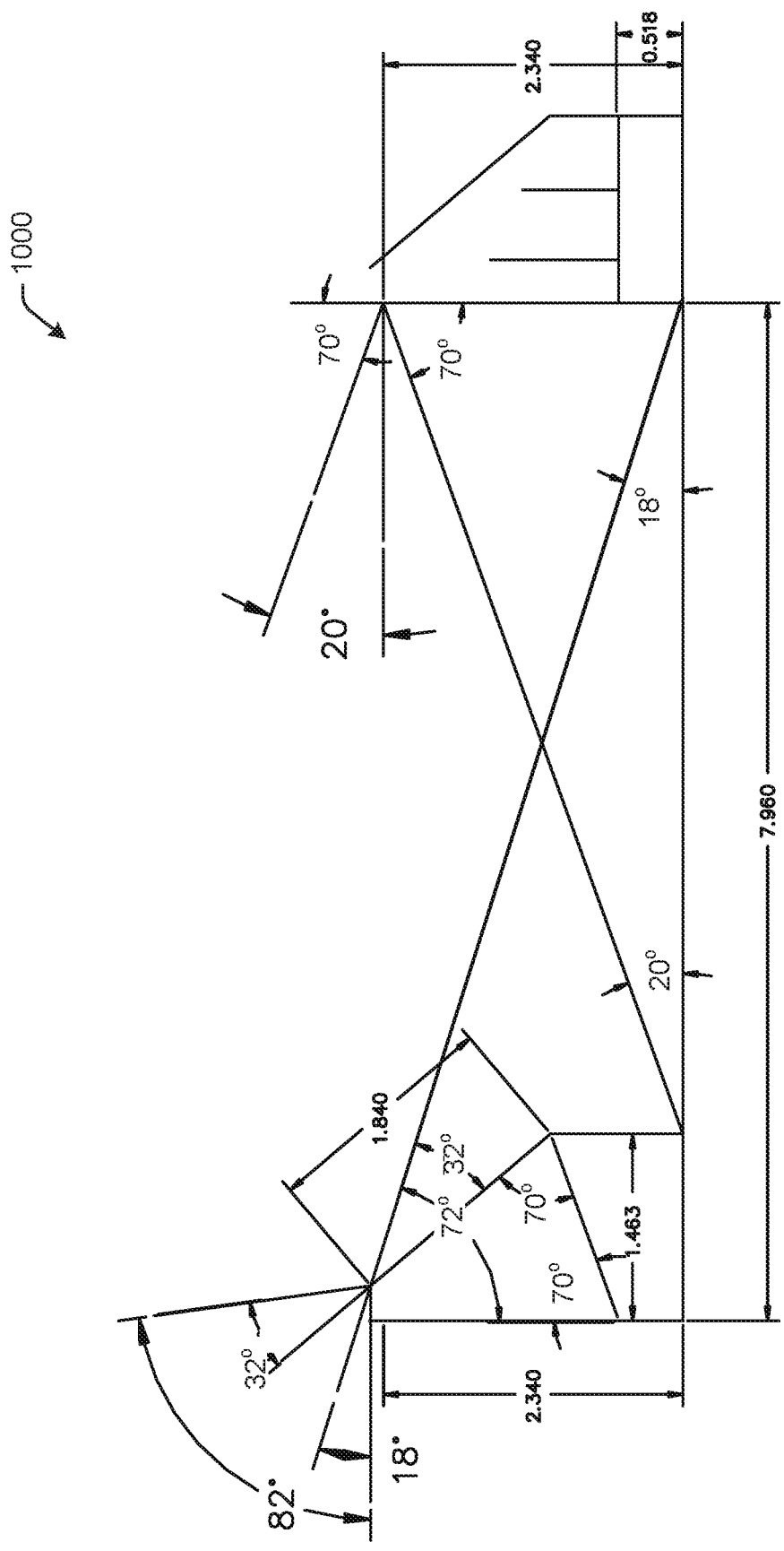
FIG. 10 illustrates an example design with improved entrance and frontside angles (lower values) and improved backside angle.

FIG. 10 illustrates an example design 1000 with improved entrance and frontside angles (lower values) and improved backside angle. For example, below is an example of the basic design (Case 1) optimized for better performance. This custom design has improved entrance and frontside angles (lower values) and improved backside angle.

In this example, the entrance angle is equal to the total height/distance (center to base of next extrusion) in radians, multiplied by 57.265 to get degrees. The height can be determined from a desired angle or the angle from the desired height.

The backside maximum reflected angle is the complement of the entrance angle. The backside maximum reflected angle is divided by 2, and is the vertex angle for the backside to reflect a sun elevation angle of about 90°. A smaller or larger vertex angle affects the sun elevation angle. This vertex angle defines the base width for 90° sun elevation angle. The frontside angle is (90-sun elevation angle) plus 2 times the tilt angle in degrees.

Using these equations creates a basic triangular extrusion. A mechanical drawing program such a SOLID WORKS™ or TURBOCAD™ can be implemented to optimize the basic design.

The sun elevation angles for Miami, Fla. and Portland, Me. were checked to determine what minimum and maximum sun elevation angles that are of concern to this design, as follows:

Miami Fla.
  January 21—0840 hours elevation 17.56°
  July 21—1240 hours elevation 83.33°
Portland Me.
  January 21—0900 elevation 15.24°
  Jan. 21 1130 hours elevation 26.29°
  Jul. 21 1130 hours elevation 66.40°

A small modification to the rotated present extrusion can be made to cover most of North America. But extreme Northern or Southern latitudes would require CASE 2 or a different design extrusion (e.g., a rotatable reflector or rotatable extrusion).

It is noted that the reflected sunlight exits the extrusion at a compound angle. Both the azimuth incident angle and the reflected elevation angle form the compound angle.

It is noted that the examples shown and described are provided for purposes of illustration and are not intended to be limiting. Still other examples are also contemplated.

The invention claimed is:

1. A method of designing a shade and shadow minimizing system for providing artificial light to a plant canopy, comprising: providing a plurality of luminaires each having a plurality of spaced apart reflector extrusions each including: two triangular ends; a base having at least first and second base edges; an apex opposite from and above the base; a first reflective outer surface between the two triangular ends, the first base edge and the apex; a second reflective outer surface between the two triangular ends, the second base edge and the apex; and wherein the first and second reflective outer surfaces are angled such that for a given sun elevation angle, sunlight impinging on the first reflective outer surface is reflected between and below the extrusions and into the plant canopy, while for the given sun elevation angle, sunlight impinging on the second reflective outer surface is also reflected between and below the extrusions and into the plant canopy; with each of the extrusions housing one or more light sources configured to direct light into the plant canopy; determining a number of the plurality of luminaires sufficient to provide the artificial light for the plant canopy; determining waste heat generated by the luminaires; and determining spacing (d) of the luminaires over the plant canopy so that sunlight is reflected into the plant canopy to reduce shade and shadow.

2. The method of claim 1, further comprising determining a maximum vertex angle from a maximum backside angle.

3. The method of claim 2, wherein the maximum vertex angle is minus equal to the maximum reflected angle in degrees divided by 2.

4. The method of claim 3, further comprising determining a maximum front side reflected angle from total height, inner distance, and vertex angle of each of the luminaires.

5. The method of claim 4, wherein the maximum front side reflected angle is defined as 90 degrees minus an elevation angle plus two times a tilt angle.

6. The method of claim 5 further comprising after all dimensions are determined, checking that a total surface area of a housing of each of the luminaires is sufficient to release waste heat from the luminaires.

7. The method of claim 3, wherein the maximum vertex angle reflects a 90° sun elevation angle completely into the plant canopy.

8. The method of claim 1, further comprising determining total height of each of the luminaires from a sun entrance angle.

9. The method of claim 1, further comprising determining a sun entrance angle from a total height of each of the luminaires .

10. A shade and shadow minimizing luminaire for a plant canopy, comprising: a plurality of spaced apart reflector extrusions each including: two triangular ends; a base having at least first and second base edges; an apex opposite from and above the base; a first reflective outer surface between the two triangular ends, the first base edge and the apex; a second reflective outer surface between the two triangular ends, the second base edge and the apex; and wherein the first and second reflective outer surfaces are angled such that for a given sun elevation angle, sunlight impinging on the first reflective outer surface is reflected between and below the extrusions and into the plant canopy, while for the given sun elevation angle, sunlight impinging on the second reflective outer surface is also reflected between and below the extrusions and into the plant canopy; and one or more light sources housed by each extrusion and configured to direct light into the plant canopy.

11. The extrusion luminaire of claim 10, wherein the extrusions are rotatable about 90 degrees during low sun elevation angles to optimize sunlight reflected into the plant canopy.

12. The luminaire of claim 10, wherein the extrusions minimize heat buildup.

13. The luminaire of claim 10, wherein the exterior surface of the extrusions are heatsinks.

14. The luminaire of claim 10, wherein the two triangular ends of each extrusion each have different reflection angles to redirect the sunlight into the plant canopy.

15. The luminaire of claim 10, wherein sunlight impinging on the first and/or second reflective outer surfaces of the extrusion and reflected between and below the extrusions and into the plant canopy reduces shadow loss in the plant canopy about 5% to 10%.

16. A system for providing artificial light to a plant canopy, comprising: a plurality of shade and shadow minimizing luminaires, wherein each luminaire has a plurality of spaced apart reflector extrusions each including: two triangular ends, a base having at least first and second base edges, an apex opposite from and above the base; and a first reflective outer surface between the two triangular ends, the first base edge and the apex, a second reflective outer surface between the two triangular ends, the second base edge and the apex, and wherein the first and second reflective outer surfaces are angled such that for a given sun elevation angle, sunlight impinging on the first reflective outer surface is reflected between and below the extrusions and into the plant canopy, while for the given sun elevation angle, sunlight impinging on the second reflective outer surface is also reflected between and below the extrusions and into the plant canopy; and one or more light sources housed by each extrusion and configured to direct light into the plant canopy.

\* \* \* \* \*